(12) United States Patent
Kainulainen et al.

(10) Patent No.: US 12,149,982 B2
(45) Date of Patent: Nov. 19, 2024

(54) METHODS AND APPARATUSES FOR TRANSMITTING AND RECEIVING DATA IN AN NR SYSTEM

(71) Applicant: INTERDIGITAL PATENT HOLDINGS, INC., Wilmington, DE (US)

(72) Inventors: Jani-Pekka Kainulainen, London (GB); Alain Mourad, Staines-Upon-Thames (GB); Jaehyun Ahn, Seoul (KR); Ulises Olvera-Hernandez, Montreal (CA); Charles Turyagyenda, London (GB); Giovanni Rigazzi, London (GB)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 316 days.

(21) Appl. No.: 17/764,807

(22) PCT Filed: Sep. 30, 2020

(86) PCT No.: PCT/US2020/053383
§ 371 (c)(1),
(2) Date: Mar. 29, 2022

(87) PCT Pub. No.: WO2021/067342
PCT Pub. Date: Apr. 8, 2021

(65) Prior Publication Data
US 2022/0330083 A1 Oct. 13, 2022

Related U.S. Application Data

(60) Provisional application No. 62/908,799, filed on Oct. 1, 2019.

(51) Int. Cl.
*H04W 28/02* (2009.01)
*H04W 4/38* (2018.01)
(Continued)

(52) U.S. Cl.
CPC ......... *H04W 28/0268* (2013.01); *H04W 4/38* (2018.02); *H04W 28/12* (2013.01); *H04W 28/24* (2013.01)

(58) Field of Classification Search
CPC ... H04W 28/0268; H04W 4/38; H04W 28/12; H04W 28/24; H04W 8/04; H04W 28/10; H04L 47/2483
See application file for complete search history.

(56) References Cited

U.S. PATENT DOCUMENTS 10,911,977 B2 *  2/2021  Agiwal ............... H04W 76/11
2018/0368167 A1 * 12/2018  Kim .................. H04W 72/0446
(Continued)

FOREIGN PATENT DOCUMENTS

WO  2018/026169  2/2018
WO  2019/161269  8/2019

OTHER PUBLICATIONS

3gpp.org, 3GPP List of Work Items (Apr. 23, 2020) available at https://web.archive.org/web/20200423103218/https://www.3gpp.org/DynaReport/WI-List.htm.
(Continued)

*Primary Examiner* — Jae Y Lee
(74) *Attorney, Agent, or Firm* — Volpe Koenig

(57) ABSTRACT

Method and apparatuses for low-latency transmission of sensor data and wireless modem data are described herein. A method may comprise associating, by a Wireless Transmit/Receive Unit (WTRU), a first Unique Data Identifier (UDI) with the sensor data and a second UDI with the wireless modem data. The method may further comprise
(Continued)

generating, by the WTRU, a mapping between the first UDI and a first network Quality of Service (QoS) Flow Identifiers (QFIs) and a mapping between the second UDI and a second network QFI. The method may further comprise transmitting, by the WTRU, the sensor data and the wireless modem data to a network node.

20 Claims, 15 Drawing Sheets

(51) Int. Cl.
*H04W 28/12* (2009.01)
*H04W 28/24* (2009.01)

(56) References Cited

U.S. PATENT DOCUMENTS

| | | | |
|---|---|---|---|
| 2019/0045421 A1* | 2/2019 | Shah | H04W 40/02 |
| 2019/0320362 A1* | 10/2019 | Liu | H04W 28/0263 |
| 2019/0350020 A1* | 11/2019 | Kim | H04W 8/205 |
| 2020/0059817 A1* | 2/2020 | Baek | H04W 28/0273 |
| 2022/0124469 A1* | 4/2022 | Liao | H04L 67/34 |
| 2023/0007527 A1* | 1/2023 | Baek | H04W 28/0268 |
| 2023/0066625 A1* | 3/2023 | Lee | H04W 80/12 |

OTHER PUBLICATIONS

CMCC (Moderator), "Email discussion on the scope of R17 SI enhancement of data collection for NR," 3GPP TSG RAN Meeting #88e, RP-200771 (Jun. 29-Jul. 3, 2020).
CMCC, "New SID: Study on data collection further enhancement," 3GPP TSG RAN Meeting #88e, RP-200770 (Jun. 29-Jul. 3, 2020).
CMCC, "New Study Item proposal: RAN-centric Data Collection and Utilization for NR," 3GPP TSG RAN Meeting #80, RP-181456, La Jolla, USA (Jun. 11-14, 2018).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Rapporteur (CMCC, Ericsson), "Revised WID on enhancement of data collection for SON/MDT in NR and EN-DC," 3GPP TSG RAN meeting #88-e, RP-201281, Online, (Jun. 26-Jul. 3, 2020).

Third Generation Partnership Project, "Technical Specification Group Radio Access Network; E-Utra and NR; Service Data Adaptation Protocol (SDAP) specification (Release 15)," 3GPP TS 37.324 V15.1.0 (Sep. 2018).
Third Generation Partnership Project, "Technical Specification Group Radio Access Network; NR; Radio Resource Control (RRC) protocol specification (Release 15)," 3GPP TS 38.331 V15.5.1 (Apr. 2019).
Third Generation Partnership Project, Technical Specification Group Radio Access Network; NR; Radio Resource Control (RRC) protocol specification (Release 15), 3GPP TS 38.331 V15.10.0 (Jul. 2020).
Third Generation Partnership Project, "Technical Specification Group Radio Access Network; NR; Radio Resource Control (RRC) protocol specification (Release 16)," 3GPP TS 38.331 V16.1.0 (Jul. 2020).
Third Generation Partnership Project, "Technical Specification Group Services and System Aspects; System Architecture for the 5G System (5GS); Stage 2 (Release 16)," 3GPP TS 23.501 V16.2.0 (Sep. 2019).
Third Generation Partnership Project, "Technical Specification Group Services and System Aspects; System architecture for the 5G System (5GS); Stage 2 (Release 16)," 3GPP TS 23.501 V16.6.0 (Sep. 2020).
Third Generation Partnership Project, "Technical Specification Group Services and System Aspects; System Architecture for the 5G System; Stage 2 (Release 16)," 3GPP TS 23.501 V16.0.2 (Apr. 2019).
Third Generation Partnership Project, "Technical Specification Group Services and System Aspects; Service requirements for cyber-physical control applications in vertical domains; Stage 1 (Release 17)," 3GPP TS 22.104 V17.3.0 (Jul. 2020).
Third Generation Partnership Project, "Technical Specification Group Services and System Aspects; Service requirements for cyber-physical control applications in vertical domains; Stage 1 (Release 17)," 3GPP TS 22.104 V17.1.0 (Sep. 2019).
Third Generation Partnership Project, "Technical Specification Group Radio Access Network; Study on Minimization of drive-tests in Next Generation Networks; (Release 9)," 3GPP TR 36.805 V9.0.0 (Dec. 2009).
Third Generation Partnership Project, "Technical Specification Group Services and System Aspects; Architecture enhancements for 5G System (5GS) to support Vehicle-to-Everything (V2X) services (Release 16)," 3GPP TS 23.287 V16.4.0 (Sep. 2020).
Third Generation Partnership Project, "Technical Specification Group Services and System Aspects; Architecture enhancements for 5G System (5GS) to support Vehicle-to-Everything (V2X) services (Release 16)," 3GPP TS 23.287 V16.0.0 (Sep. 2019).
Third Generation Partnership Project, "Technical Specification Group Services and System Aspects; Architecture enhancements for 5G System (5GS) to support Vehicle-to-Everything (V2X) services (Release 16)," 3GPP TS 23.287 V1.1.0 (Jul. 2019).
Third Generation Partnership Project, "Technical Specification Group Radio Access Network; NR; NR and NG-RAN Overall Description; Stage 2 (Release 15)," 3GPP TS 38.300 V15.7.0 (Sep. 2019).
Third Generation Partnership Project, "Technical Specification Group Radio Access Network; NR; NR and NG-RAN Overall Description; Stage 2 (Release 16)," 3GPP TS 38.300 V16.2.0 (Jul. 2020).
Third Generation Partnership Project, "Technical Specification Group Radio Access Network; NR; NR and NG-RAN Overall Description; Stage 2 (Release 15)," 3GPP TS 38.300 V15.10.0 (Jul. 2020).
Third Generation Partnership Project, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)," 3GPP TS 37.320 V15.0.0 (Jun. 2018).
Third Generation Partnership Project, "Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)," 3GPP TS 37.320 V16.1.0 (Jul. 2020).

(56) References Cited

OTHER PUBLICATIONS

Third Generation Partnership Project, "Technical Specification Group Radio Access Network; E-Utra and NR; Service Data Adaptation Protocol (SDAP) specification (Release 16)," 3GPP TS 37.324 V16.1.0 (Jul. 2020).

Third Generation Partnership Project, "Technical Specification Group Radio Access Network; NR; Radio Resource Control (RRC) protocol specification (Release 15)," 3GPP TS 38.331 V15.7.0 (Sep. 2019).

Third Generation Partnership Project, "Technical Specification Group Services and System Aspects; Study on enhancements for cyber-physical control applications in vertical domains; Stage 1 (Release 17)," 3GPP TR 22.832 V17.2.0 (Jul. 2020).

Third Generation Partnership Project, "Technical Specification Group Services and System Aspects; Study on enhancements for cyber-physical control applications in vertical domains; Stage 1 (Release 17)," 3GPP TR 22.832 V1.1.1 (Sep. 2019).

* cited by examiner

Closed Loop Control System Schematic View

METHODS AND APPARATUSES FOR TRANSMITTING AND RECEIVING DATA IN AN NR SYSTEM

CROSS-REFERENCE TO RELATED APPLICATIONS

This application is the U.S. National Stage, under 35 U.S.C. § 371, of International Application No. PCT/US2020/053383 filed Sep. 30, 2020, which claims the benefit of U.S. Provisional Application No. 62/908,799, filed Oct. 1, 2019, the contents of which are incorporated herein by reference.

BACKGROUND

The Third-Generation Partnership Project (3GPP) is commencing work to identify challenges in vertical applications related to wireless communication. Some of the upcoming cases focus on cyber-physical control applications, which may require very high levels of communication service availability. Some of the applications may also require very low end-to-end latencies. For example, industrial use cases may require extremely low latency and determinism along data paths to and from the network. Factory automation deals with the automated control, monitoring and optimization of processes and workflows within a factory. This includes aspects like closed-loop control applications (e.g., based on programmable logic or motion controllers) and robotics, as well as aspects of computer-integrated manufacturing. Factory automation generally represents a key enabler for industrial mass production with high quality and cost-efficiency. Corresponding applications may be characterized as imposing the highest requirements on the underlying communication infrastructure, especially in terms of communication service availability, determinism, and latency. Investigation into advancements that allow existing frameworks to meet such requirements is underway, targeting 3GPP Release 17 with the aim of supporting lower latencies and determinism when compared to capabilities currently supported by Fifth-Generation (5G) New Radio (NR) technologies. Thus, factory control systems may be one example of an application that may benefit from the methods, apparatuses, and improvements thereof discussed herein.

SUMMARY

Method and apparatuses for low-latency transmission of sensor data and wireless modem data are described herein. A method may comprise associating, by a Wireless Transmit/Receive Unit (WTRU), a first Unique Data Identifier (UDI) with the sensor data and a second UDI with the wireless modem data. The method may further comprise generating, by the WTRU, a mapping between the first UDI and a first network Quality of Service (QoS) Flow Identifiers (QFIs) and a mapping between the second UDI and a second network QFI. The method may further comprise transmitting, by the WTRU, the sensor data and the wireless modem data to a network node.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
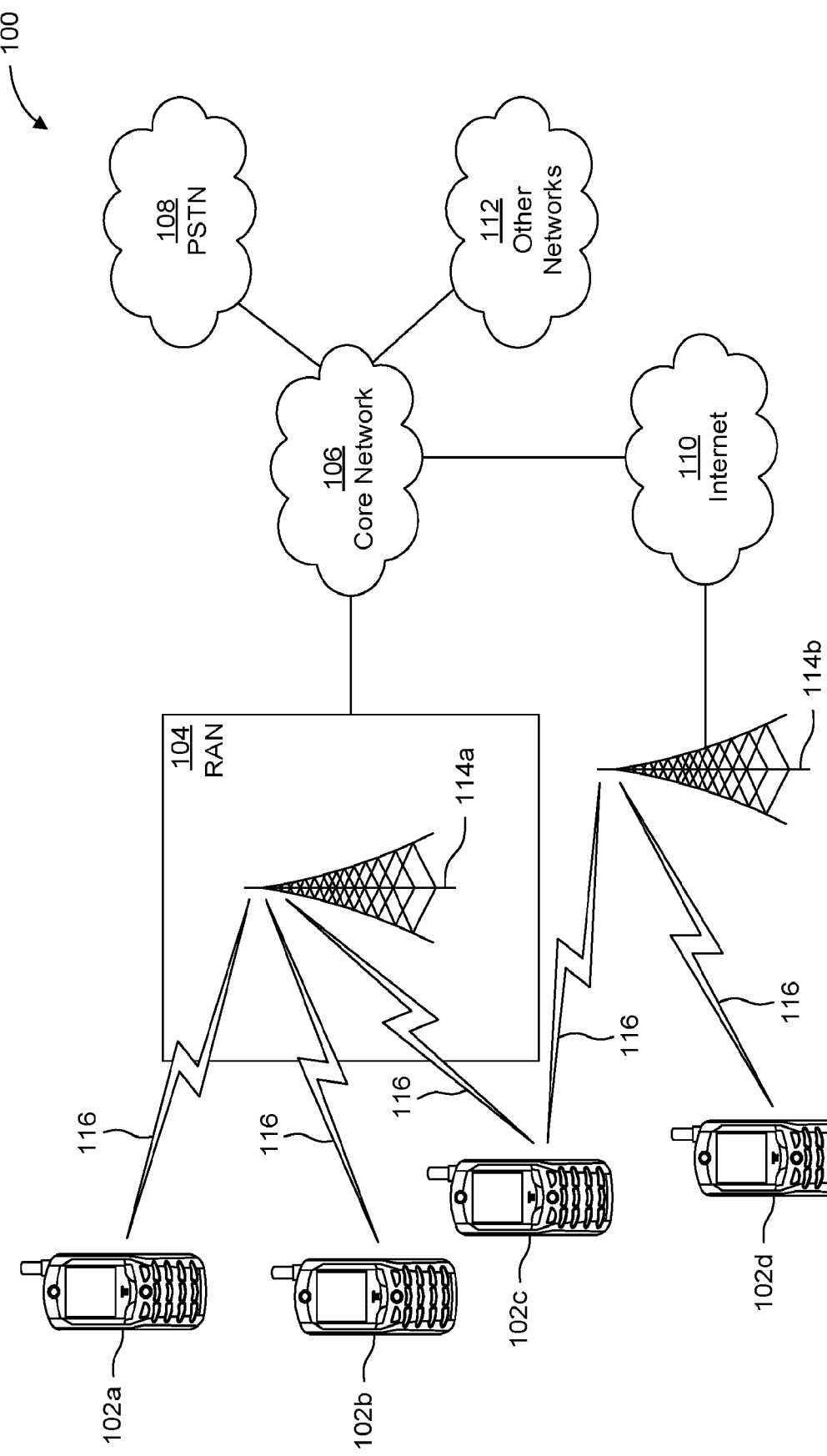
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
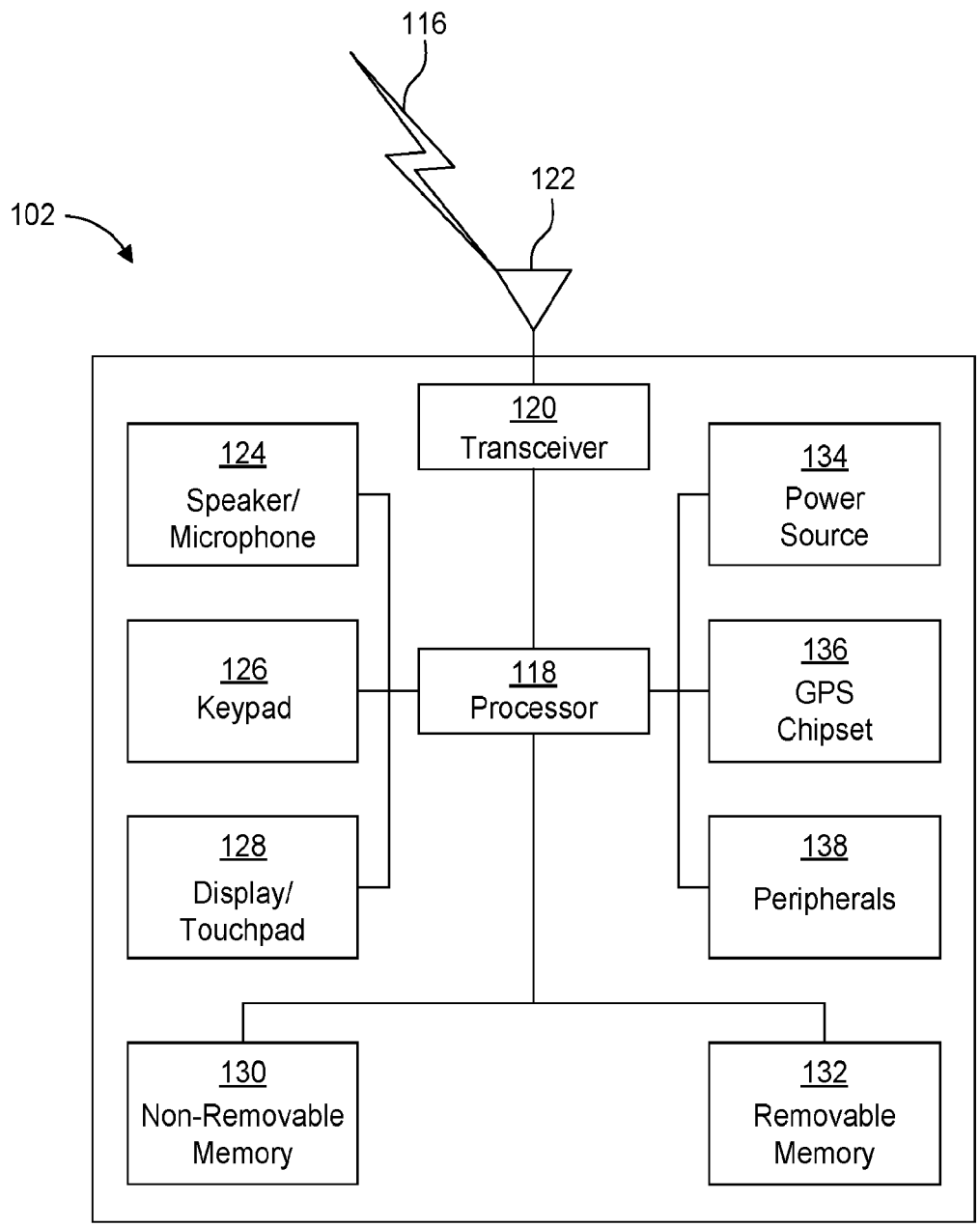
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
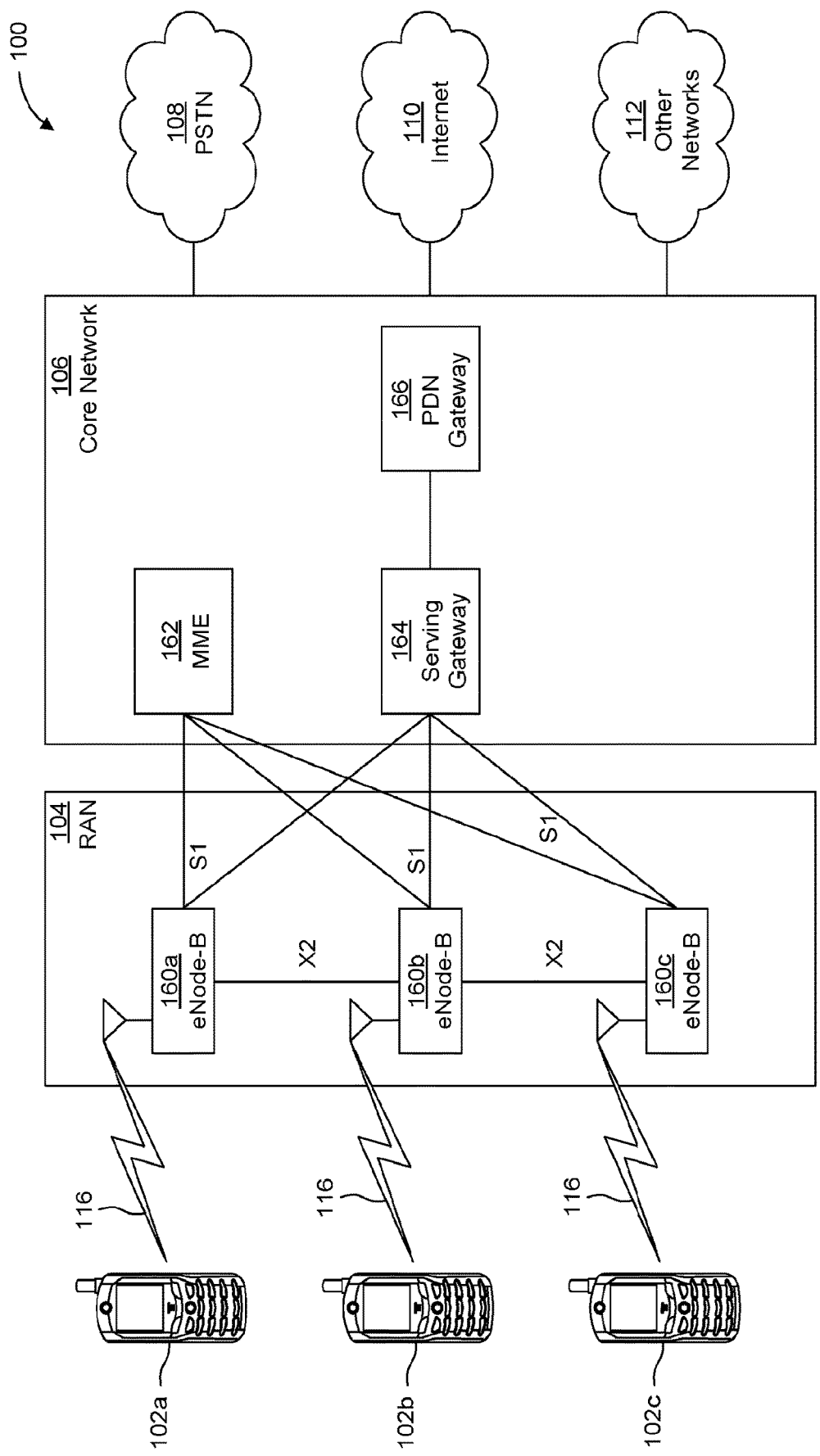
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

Figure 10:
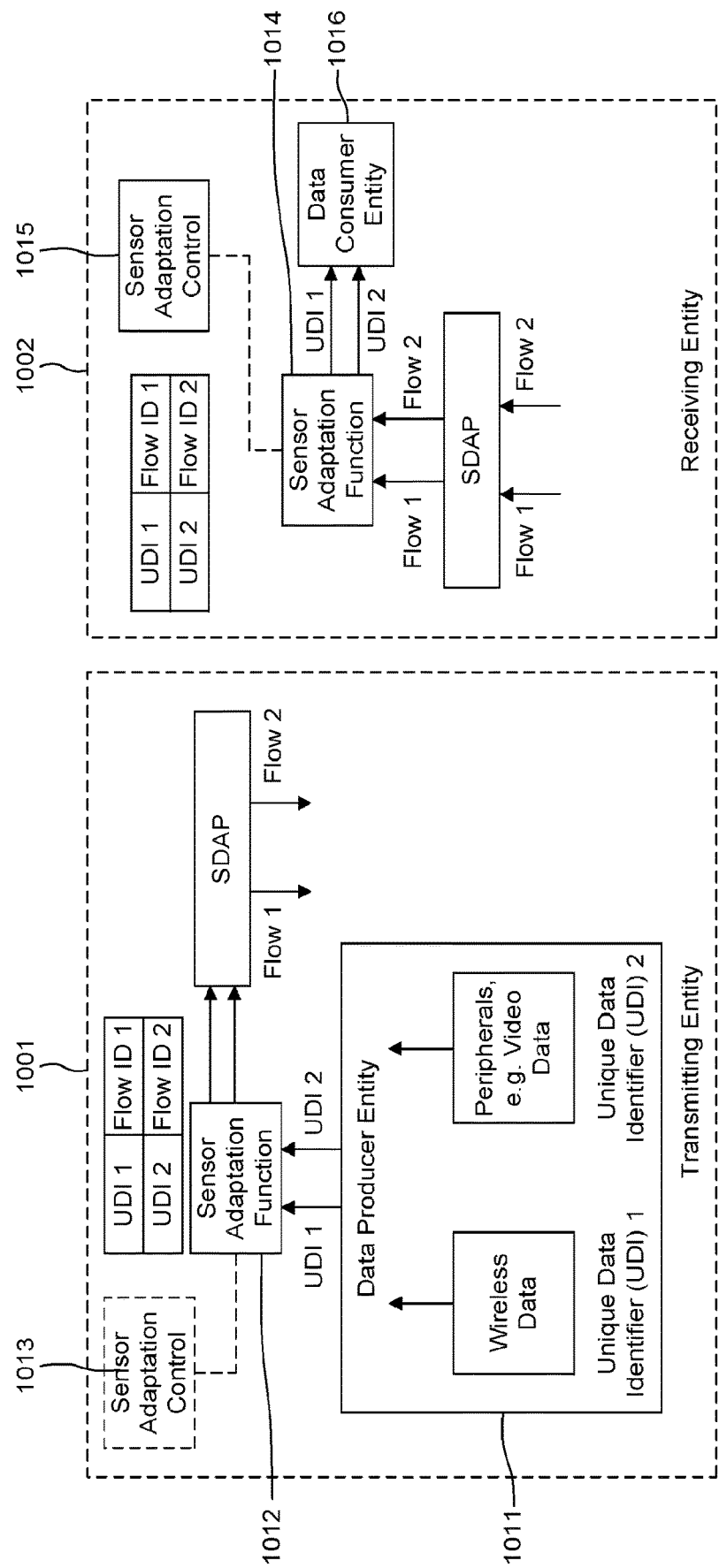
FIG. 10 portrays an example flow of data and mapping of Unique Data Identifier (UDI) to Flow IDs of an NR system.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by the transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
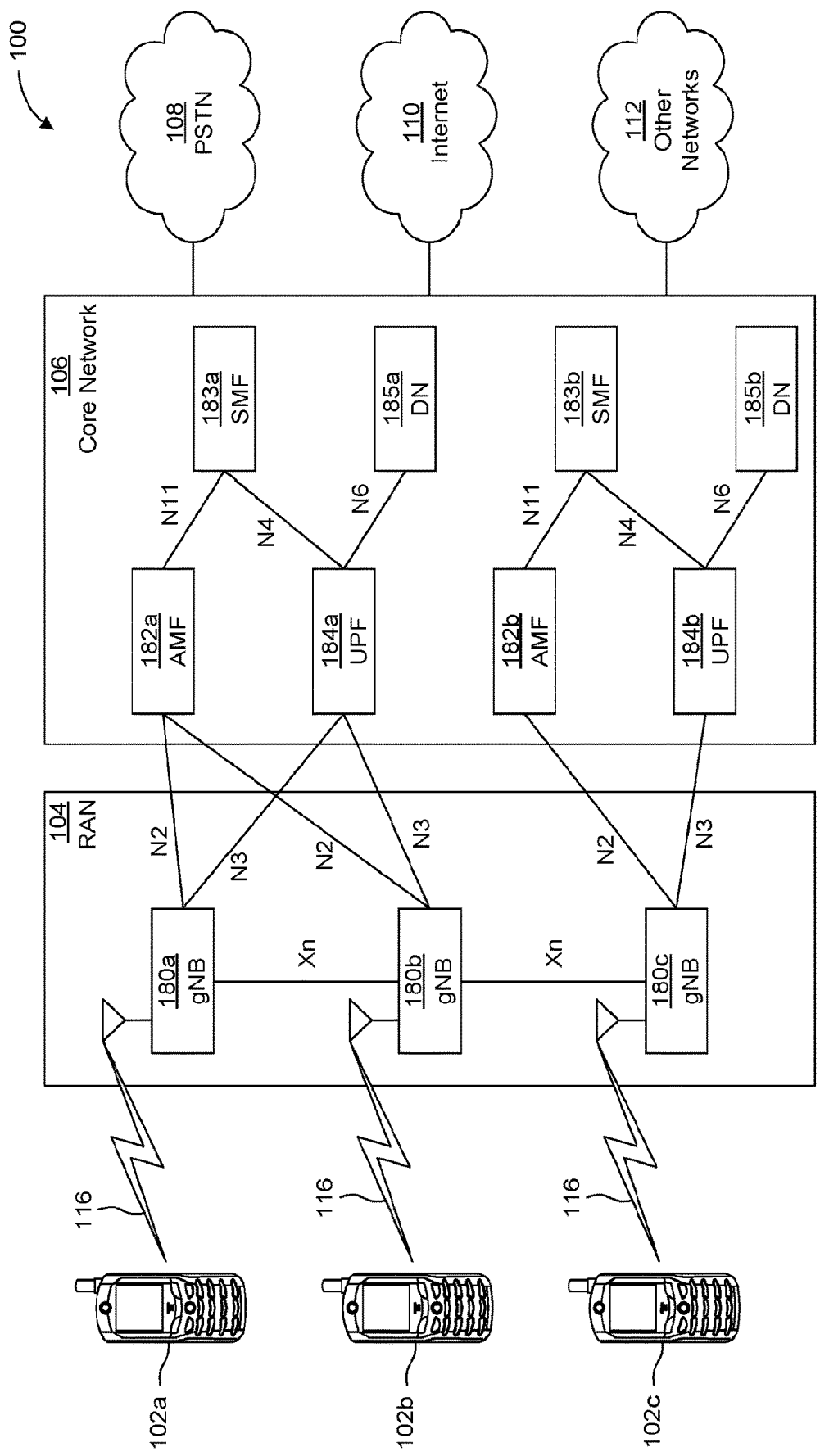
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Today's Radio Access Network (RAN) latency may be reduced to 1 ms using current 5G NR Ultra-Reliable Low-Latency Communication (URLLC) transmission schemes.

This reduction may apply only to the RAN User Plane latency and may not consider application processing, transport processing, or the translation of User Plane (UP) packets to Internet Protocol (IP) packets, in cases where IP protocol is used. This means that the amount of processing that may be carried out within the time budget permitted by the application may depend on the achievable end-to-end network latency, and not only the RAN latency. The lower the achievable end-to-end network latency, the larger the time budget may be for application processing.

Industrial use cases, especially in closed-loop control systems, may require low latency and determinism from the network. This latency may be required not only at the radio level, but in end-to-end, including radio, transport, core and application (including processing) layers. 3GPP is currently commencing a study on industry verticals for Release 17 with the aim of supporting lower latencies and determinism when compared to capabilities currently possible what is possible through 5G NR.

Figure 2:
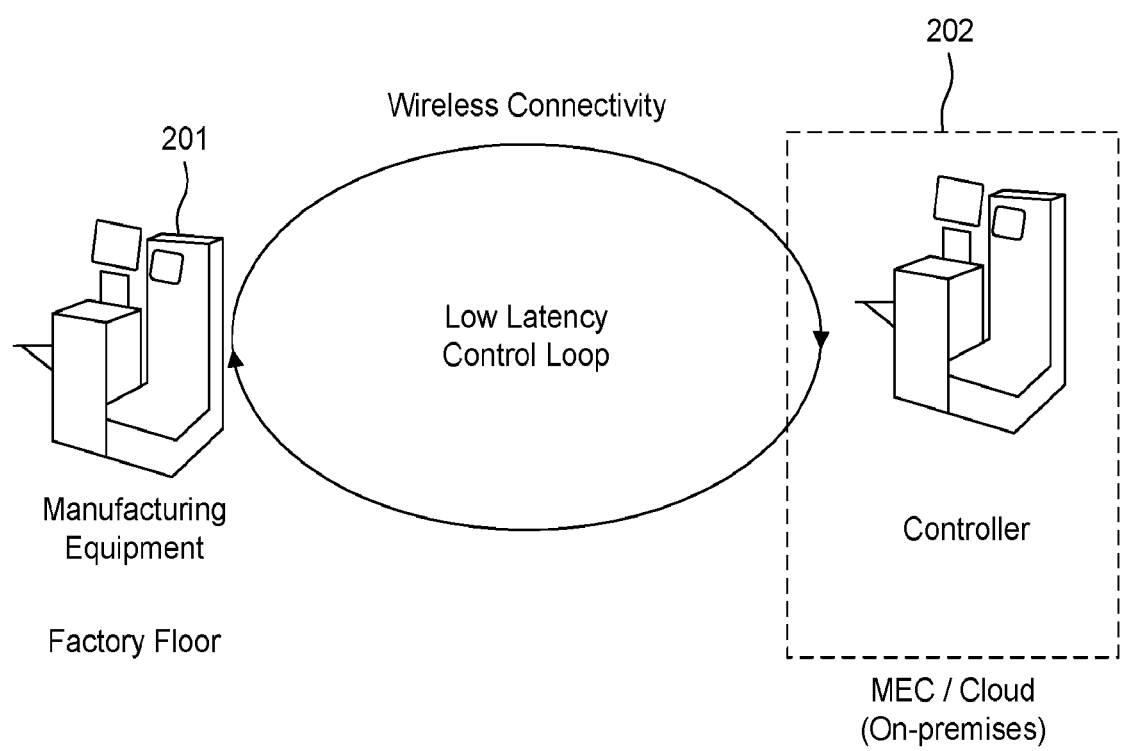
FIG. 2 illustrates a generic scenario in which a factory floor contains equipment (e.g., manufacturing equipment) 201 connected to a digital twin.

FIG. 2 illustrates a generic scenario in which a factory floor contains equipment (e.g., manufacturing equipment) 201 connected to a digital twin that may be accessed, for example, via a multi-access edge computing (MEC) platform or cloud available on-premises, shown at 202. A digital twin may refer to a digital representation of a physical object that interacts with other digital systems. To be able to offload functionality (e.g., control functionality) to a digital twin system, one-way latency, as well as round-trip latency, may need to be low. Control processes may be carried out by the digital twin based on data received, periodically or aperiodically, from sensors monitoring activities on the factory floor.

3GPP has encouraged investigation into mechanisms for RAN-centric data collection. Minimization Drive Test (MDT) presents one such mechanism. MDT functionality was introduced in 3GPP Long-Term Evolution Release 10 to enable the collection of data directly from one or more WTRUs via control plane mechanisms and reduce the costs associated with drive tests (e.g., driving a car within physical network locations). Originally used to send network optimization data to the RAN and reduce operational costs, the initial design of the MDT was not intended for transmission of large amounts of data originating from WTRU to the network. However, new RAN architectures in NR (e.g. centralized unit (CU) and distributed unit (DU) interfaces), more powerful storage and computing capabilities, as well as emerging technologies in industry (e.g. Machine Learning), provide new opportunities for data collection and utilization, therefore spurring further study and investigation into potential enhancements.

Other methods may also be used to perform data collection. For instance, it may also be possible to perform limited data collection via sidelink applications and/or via proprietary sidelink implementations.

Methods and apparatuses described herein may address the problem of how to send sensor data in a deterministic manner from a WTRU to the network. Embodiments disclosed herein may also addresses the problem of how a transmitting data source (e.g. in a scenario involving a large number of industrial sensors) is identified on the receiving end. Wireless data collection may be performed, for example, via MDT or via sidelink applications. MDT may allow for specific measurements to be sent via a control channel. On the other hand, sidelink may allow for proprietary implementation of an application to send data via a sidelink server application in the core network. One problem with MDT is that it may not allow for generic data transmission or prioritization of the data source or sources. Such problems with the MDT data path may become evident when the amount of data sent via MDT increases. As the amount of sensor data sent via control plane (MDT) increases, the SRB queues may become unnecessarily congested and block important configuration signaling. Furthermore, the MDT may not provide QoS differentiation between MDT data and configuration signaling, or differentiation among data originating from different sources.

One problem with the sidelink approach is that it may rely on proprietary mechanisms and may not provide determinism and low latency for closed-loop control systems. When low latency data is sent via sidelink, the sidelink data may be required to circulate through a core network NetWork-Data Analytics Function (NWDAF), which may be unnecessary if the data is already consumed close to RAN. With the current NR QoS framework, there may be an additional problem with Dedicated Radio Bearer (DRB) scalability in a factory use case, where traffic differentiation is required. The NR QoS framework may capable of differentiating traffic based on traffic type (i.e. similar traffic types may be mapped to the same QFI and again to a DRB). In NR systems, the number of DRBs supported may depend on the Logical Channel ID (LCID) space. The number of supported QoS Flow Identifiers (QFIs) may be limited by a 6-bit header found in an Service Data Adaptation Protocol (SDAP) header, and it also may be enforced by the core network. As the number of sensors attached to a UE (e.g., an industrial WTRU) increases (e.g. 100 to 1000s sensors in a machine), the traffic-based flow differentiation framework may not scale or provide information about the destination of the data source, as the differentiation may be based on traffic type. Even if the sensors would be grouped into multiple WTRUs, the amount of DRB resources (e.g., memory or processing capacity) that are shared in a Fifth-Generation NodeB (gNB) may be fixed, such that allowing more DRBs per WTRU and per PDU session may not suffice to resolve the issue.

Various solutions to the above-described problems are described herein. One proposed solution to the problems above may be to introduce a new user plane data path for low-latency cases. This data path may be implemented via an adaptation function in the SDAP, which may link one or more data producers and one or more consumers. Solutions may be data agnostic and may be used in scenarios where, for instance, a RAN (e.g., via a virtualized application attached to a gNB) collects data from WTRU peripherals.

Some solutions may introduce a new function (e.g., as an SDAP mechanism), and an identifier associated with one or more sensing data sources, to the WTRU. This may allow low latency systems to perform data source (i.e., sensor) differentiation in addition to traffic-based differentiation (i.e., QFI-based). It is worth noting that the same mechanism may be applied to WTRU sensing data that originates from WTRU peripherals. The sensor adaptation function introduced by this invention may connect directly with the user plane.

Solutions may enable transmission of data transparently and directly from the WTRU to the RAN CU while maintaining a QoS for each transmitted data stream. A network implementing one or more aspects of the described solutions may associate a WTRU Unique Data Identifier (UDI) and a QFI via the Sensor Adaptation Function (SAF) and SAF controller. In some solutions, a UE may transmit peripheral sensor data as SDAP SDUs to a Central Unit (CU) directly via a user plane pipeline and maintain one or many global identifiers of the sensors/actuation units. According to some solutions, the sensor data may be acquired via a WTRU modem-level interface with the factory device (i.e., a WTRU vendor may implement a proprietary interface between an application processor and modem). According to some embodiments, solutions may be symmetrical. For instance, a transmitting entity and a receiving entity may both have data producer, consumer entities, and/or SAF functions that provide UDI association capabilities. Some solutions may also allow the RAN gNB CU to process received WTRU data directly, as well as to send data directly to the WTRU. Some solutions may provide for improvements to sidelink implementations. For example, the transmitting and receiving end points may also be implemented in a sidelink server that is emulated in a RAN. In this case, the SAF may use a PC5 interface for communication. The UDI mechanism may remain the same.

Various benefits of the proposed solutions are described herein. One or more of the solutions may allow the 3GPP system to have one or more additional, generic, and low-latency data paths between the WTRU and the gNB, where priorities of each individual sensor data stream can be controlled via the 5G NR QoS Framework. UDI may allow the flow framework to be scalable without losing backwards compatibility (e.g. by modifying the SDAP QFI length). Additionally, mechanisms according to the proposed solutions may allow the 3GPP RAN data framework to evolve beyond wireless data transmission (i.e. MDT). The desire to provide greater functionality within closed loop control systems, as discussed substantially in paragraphs above, may be one motivating factor.

An SAF may be used to provide information from the WTRU to the network or vice versa. The SAF may allow an industrial control system to be attached directly to the SDAP layer (for example, via a gNB, or a Distributed Unit (DU) of the gNB) and reduce latency while maintaining the benefits that are provided by a deterministic radio system (low-latency, duplication, retransmissions, etc.). Additionally, the SAF may allow the traffic to not only be differentiated based on QoS requirements, but also based on an originating source.

Figure 3:
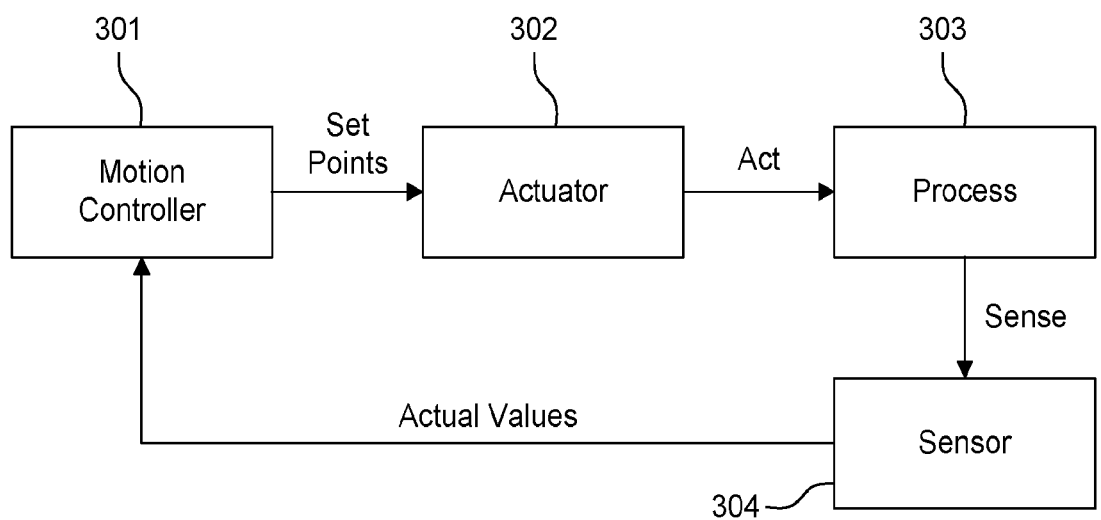
FIG. 3 illustrates a generic example of a traditional closed-loop control system.

FIG. 3 illustrates a generic example of a traditional closed-loop control system. A motion controller 301 may interface with an actuator 302, which may initiate a process 303 according to instructions from the motion controller 301. The process 303 may next trigger a sensor 304 to generate feedback or measurements based on outputs from the process 303. The sensor 304 may transmit the actual values of the feedback or measurements directly to the motion controller 301, which may then analyze or process the feedback or measurements in order to provide commands to the actuator 302. The data consumer entity may be, in this case, the motion controller, and the data producer entities may be the sensors.

Figure 4:
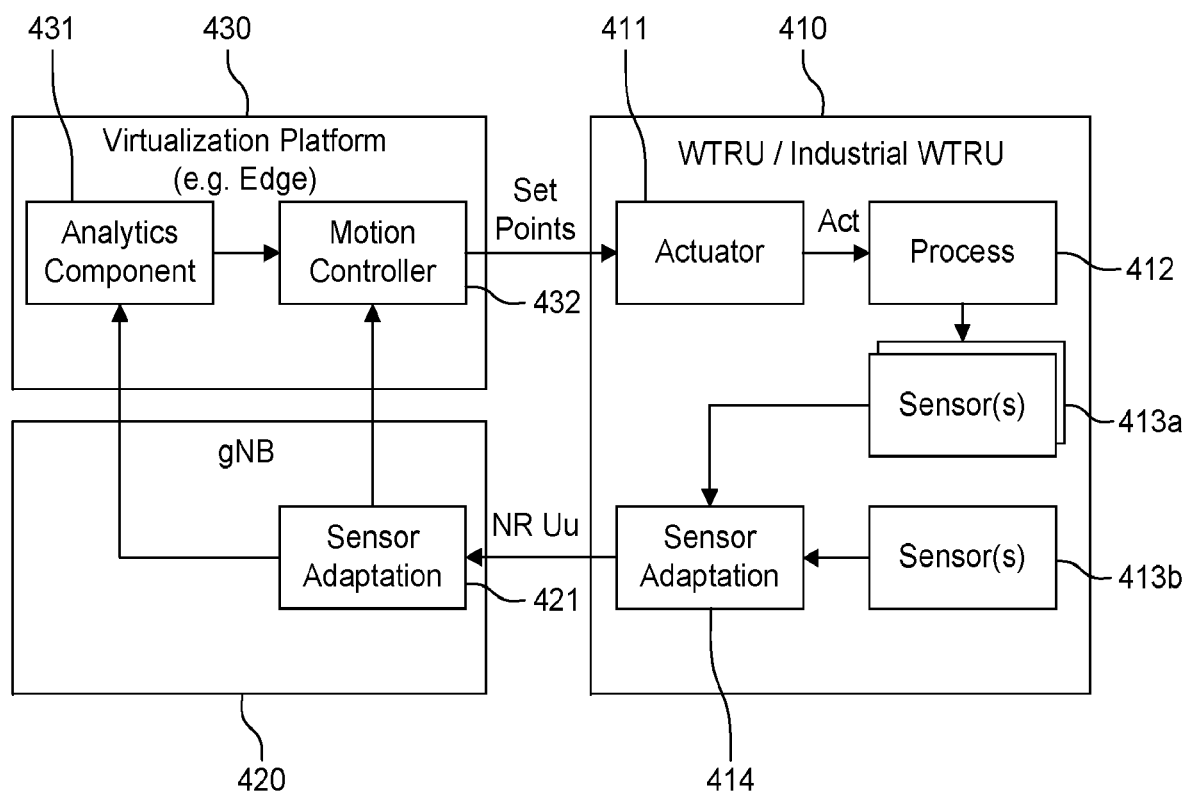
FIG. 4 illustrates a Sensor Adaptation Function (SAF) as implemented in an example low-latency industrial control system.

FIG. 4 illustrates an SAF as implemented in an example low-latency industrial control system. A WTRU or industrial WTRU 410 operating in an industrial system (e.g., a manufacturing operation on a factory floor) may include or directly communicate with an actuator 411, one or more components 412 responsible for carrying out an industrial process, sensors 413a and 413b, and a Sensor Adaptation Function (SAF) 414. The WTRU or industrial WTRU 410 may communicate with a gNB 420 via an interface (e.g., an NR air interface, as shown). The gNB 420 may be configured with an SAF 421 that is configured to receive data flows from the WTRU's SAF 414. The SAF 421 may be implemented directly in the SDAP layer or a DU of the gNB 420. The SAF 421 may interface with analytics components 431 and/or one or more motion controllers 432, which may be implemented in a virtualization platform such as a MEC platform. The actuator 411 may initiate or update instructions for the processing components 412. The sensors 413a and 413b may generate feedback or measurements based on outputs from the processing components 412 and subsequently provide the feedback or measurements to the SAF 414. The SAF 414 may communicate the feedback or measurements to the SAF 421 of the gNB 420, which may then route the data flow to the analytics components 431 and/or the motion controller 432 at the virtualization platform 430. The analytics component 431 may process the feedback or measurements, which may indicate to the motion controller 432 to provide instructions or adjustments by which the WTRU or industrial WTRU 310 may carry out the industrial process.

Figure 5:
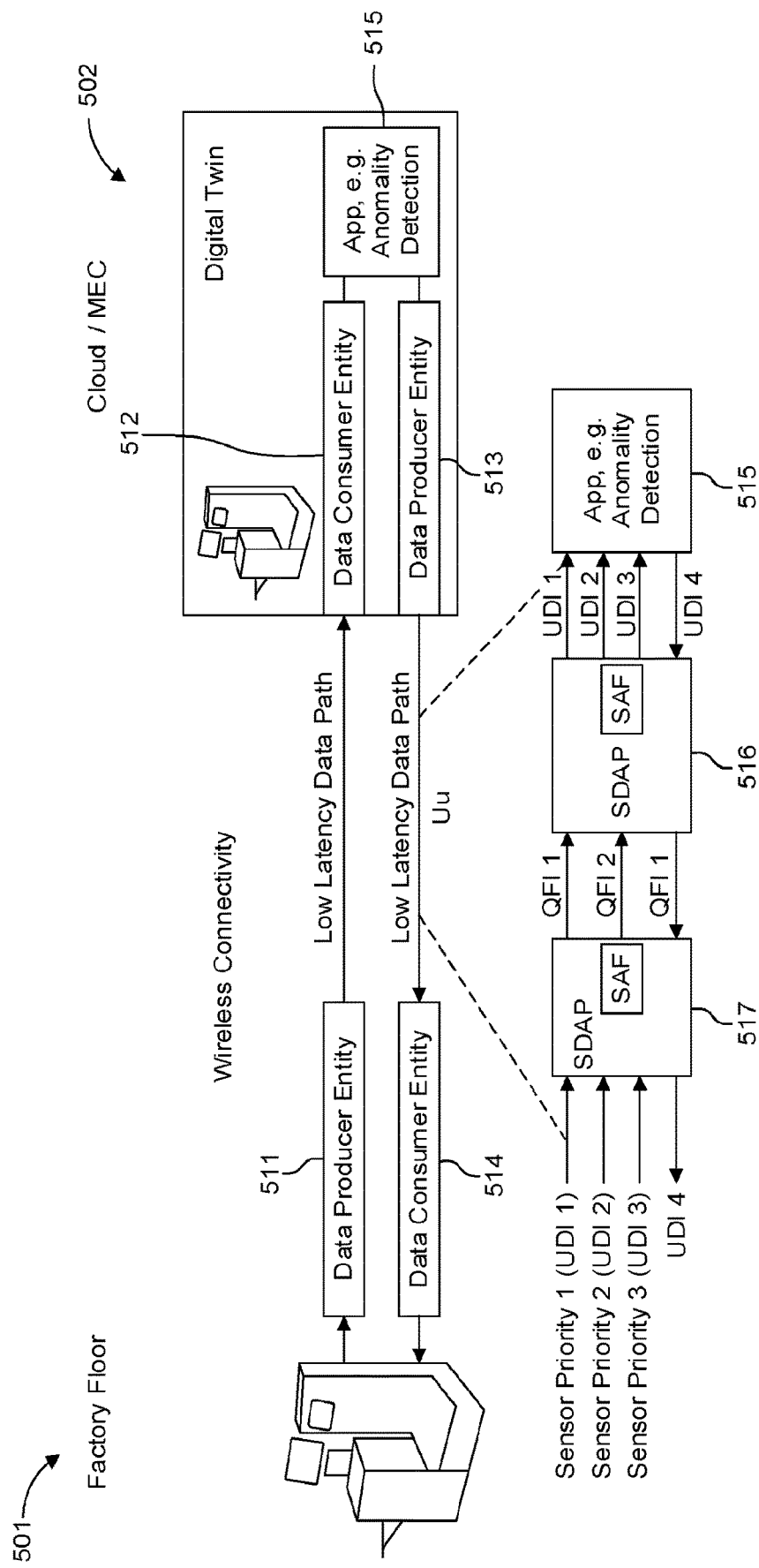
FIG. 5 is another example of an application using an SAF to carry sensor identifiers via a Quality of Service (QoS) Flow Identifier (QFI) framework.

FIG. 5 is another example of an application using an SAF to carry sensor identifiers via a QFI framework. Industrial processes may be performed on a factory floor 501, where a data producer entity 511 sends data flows over a low-latency path towards a digital twin implemented in a cloud-based or multiple access edge platform 502. The digital twin may have a corresponding data consumer entity 512 that receives the data flows from the data producer entity 511. A data producer entity 513 may send data flows over a low-latency data path toward a data consumer entity 514 at the factory floor. As shown in FIG. 5, an application 515 may perform analytics for control signaling via anomaly detection. For example, upon receiving feedback or measurement information from the factory floor, via the entities 511 and 512, the anomaly detection application 515 may process the information and cause control commands to be returned towards the factory floor via entities 513 and 514. In an industrial anomaly detection scenario, the faster the machine can be stopped, or the faster the control path can be changed, the better the system may be preserved from catastrophic failures. Thus, with lower latencies, the consumer may be allotted more time to process the data. FIG. 5 also illustrates devices producing multiple control signal types, which the receiving application (e.g., the DNN-based anomaly detection) may use as input features. In complex systems, these input features (i.e., sensor readings) may have different latency requirements. Thus, as depicted in FIG. 5, the data paths may pass through SDAP layers 516 and 517 at the transmitting and receiving sides. The SDAP layers may include SAF entities, which may associate data flows from one or more sensors with UDIs. By identifying the data sources, the SDAP layer and/or SAF 516 may determine priority levels corresponding to the data flows (e.g., QoS Flow Identifiers (QFIs)) before and provide such information when forwarding the data flows to the receiving SDAP layer/SAF 517. The receiving SDAP layer/SAF 517 may use the identifiers to transmit the data flows to the data consumer entity 512 and application 515 according to the UDI. The application 515 may process the data flows based on the UDI and provide, e.g., a control data flow towards the data consumer entity 514 via SDAP layers 516 and 517. The SDAP layers 517 and 516 may again associate the control data flow with a UDI and map the flow to a QFI, which may enable preservation of source identification and priority information when received by the data consumer entity 514.

Figure 6:
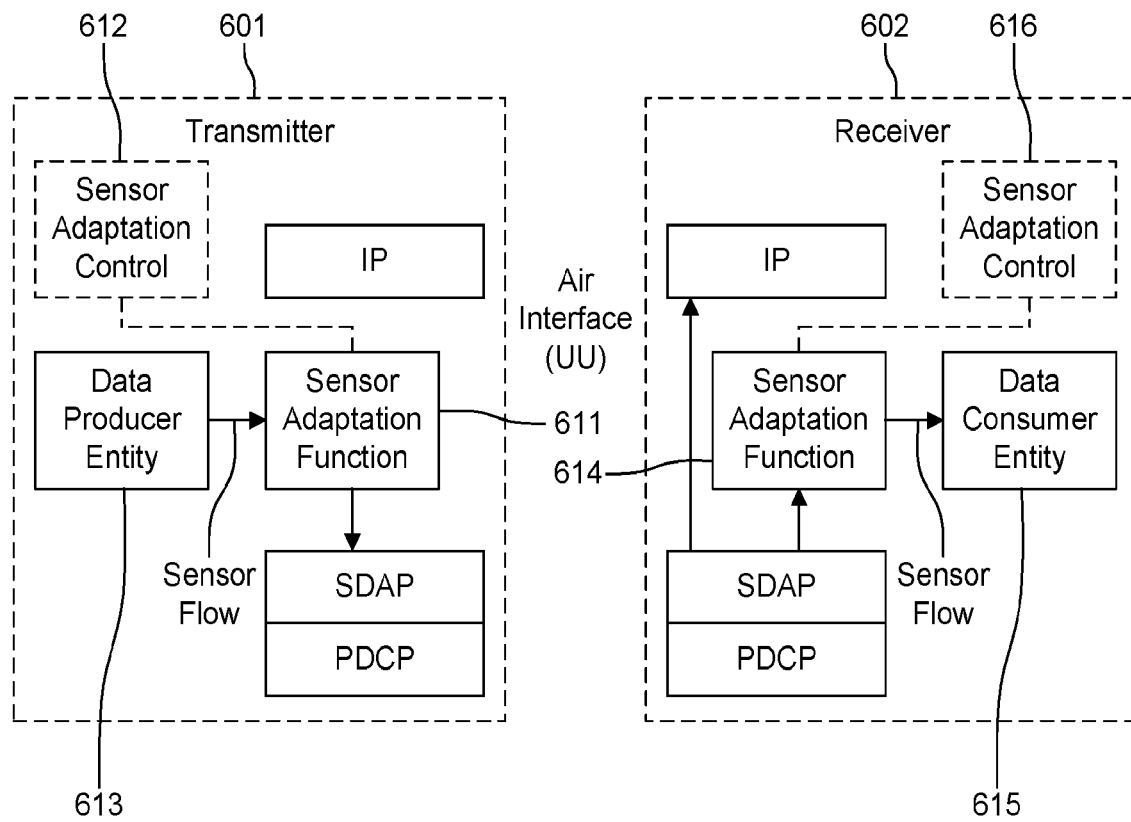
FIG. 6 depicts the implementation of an SAF that allows sensor data to be transmitted directly as SDAP Service Data Units (SDUs) and received as (Service Data Adaptation Protocol) SDAP SDUs while maintaining QoS requirements associated with the sensor data.

FIG. 6 depicts the implementation of an SAF that allows sensor data to be transmitted directly as SDAP SDUs and received as SDAP SDUs while maintaining QoS requirements associated with the sensor data. The SAF 611 may be symmetrical as shown at elements 611 and 614, meaning it may be defined on both transmitter and receiver sides 601 and 602. The SDAP SDUs may be associated with one or more Unique Data Identifiers (UDIs). The SAF 611 may map the UDIs to one or more QFIs defined by the NR framework. Each SAF may have a control entity (e.g., shown at 612 and 616) that is responsible for negotiating the QoS mapping with the NR core network functions. If needed, the control entity 612 may send requests for QFI add/modification or release operations. The SAF functionality may be implemented in a data producer or data consumer entity, or the functionality may be provided directly by an SDAP entity.

At the transmitter 601, an SAF 611 may receive data packets associated with a UDI from a data producer entity 613 and map these data packets to a correct QFI based on a preconfigured mapping. At the receiver, the SAF 614 may receive SDAP PDU/SDUs, map the CFI to the UDI, and provide the UDI-associated data flow to the data consumer entity 615. Furthermore, in some solutions at the receiver, the SDAP PDU/SDUs may be provided directly to the Internet Protocol layer for external transmission without passing through the SAF 614.

Depending on the implementation, the UDI may be an identifier that is purely defined by an application and passed transparently from data producer to consumer entity, or it may be a specific identifier that represents a value from a specification that describes standardized parameters associated with the UDI value. The UDI may be associated with or assigned to the sensing data and passed to the SAF. The SAF may map the UDI to a QoS Flow ID and the sensor data may be transmitted to the receiving entity. The SAF may then associate the UDI with the data flow before data is transmitted to the data consumer entity.

The SAF may be located, embodied, or implemented inside or outside of the SDAP entity. The SAF and/or or the SDAP entity may be located, embodied, or implemented at the transmitting and receiving sides (e.g., the WTRU and gNB or base station) via hardware or software. For example, a processor, FPGA transmitter/receiver, and/or one or more antennas may provide the functionality of the SAF and/or the SDAP entity.

New functionality may be afforded to the SDAP layer or entity via the SAF according to the embodiments described herein. For example, the SDAP controller may negotiate QFI to UDI mappings with the data producer and/or consumer entities and the network. If there is a need to establish or remap QFIs, this may be performed via traditional mechanisms (e.g., at the SDAP layer, transmitted packets may be marked according to the relevant QFIs). Upon receiving data from an external system, the data producer entity may associate the unique data identifier with a data flow, generate a PDU, and transmit the PDU to the SDAP layer. The SDAP entity may receive the data in an SDAP SDU with a UDI and associate it with a QoS Flow ID. The SDAP entity may transmit the data via traditional mechanisms to lower layers. The receiving SDAP entity may be configured with a flow that has a data consumer/producer association. The receiving SDAP entity may then transmit the SDAP SDU to the data consumer. The data consumer may receive the PDU and transmits the data flow to an external entity according to the UDI.

Figure 7:
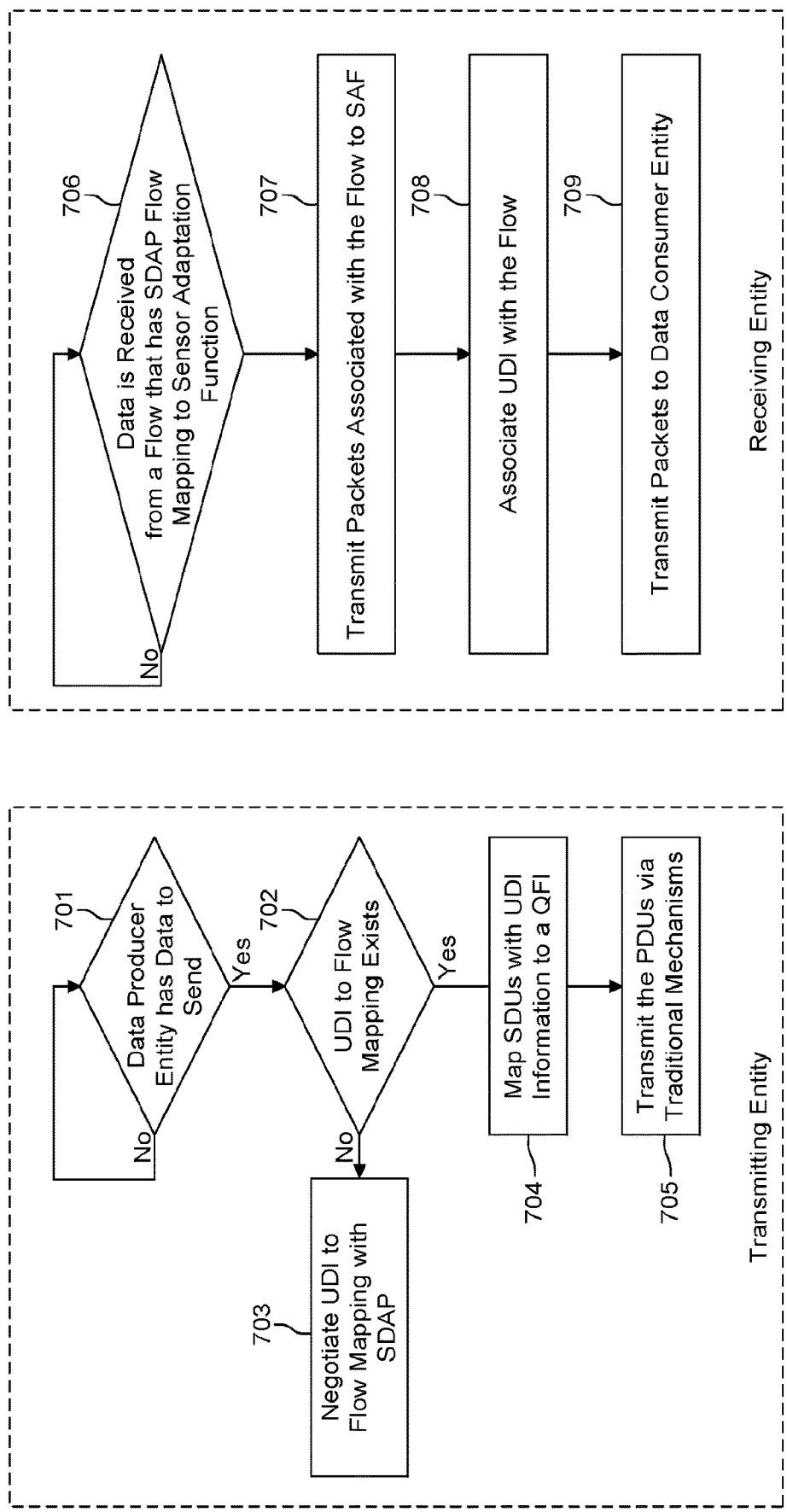
FIG. 7 is a flow chart depicting the transmission of packets from a transmitting SAF entity to a receiving SDAP and SAF entity.

FIG. 7 is a flow chart depicting the transmission of packets from a transmitting SAF entity to a receiving SDAP and SAF entity. At the transmitting entity of FIG. 7, at 701, a data producer entity may wait until it has data to send. If there is data to send, and, at 702, it is determined that a UDI to QFI mapping does not exist in the transmitting SAF function, the SAF control function may configure a QFI to UDI mapping and requests QFI establishment, modification, or removal from the corresponding core network entity, shown at 703. If there is data to send, and a UDI to QFI mapping exists, at 704, an SDU is associated with header information, and at 705, a PDU is transmitted to a QFI channel via traditional SDAP mechanisms.

At the receiving entity of FIG. 7, at 706, the receiving SAF entity may wait until there is data in a QFI that is associated with the receiving SAF/data consumer entity. Once data is received that has an SDAP flow mapping at the receiving SAF, the packets encapsulating the data may be transmitted to the receiving SAF shown at 707. At 708, the receiving SAF may associate the QFI information with the UDI information in a case where the information is included in a header. If the information is included in the header, then, at 709, the receiving SAF may transmit the SDUs to the data consumer entity based on the UDI information associated with the data. If the receiving SAF entity cannot retrieve from a UDI to QFI mapping from the header, the receiving SAF may send a message to an SAF control function at the receiving or transmitting entity indicating that the UDI to QFI mapping cannot be found. Additionally, or alternatively, the receiving SAF may request that the information be sent separately (e.g., from a controller or the transmitting SAF entity) to allow operation to continue; otherwise, the receiving SAF may simply abort the operation.

Figure 8:
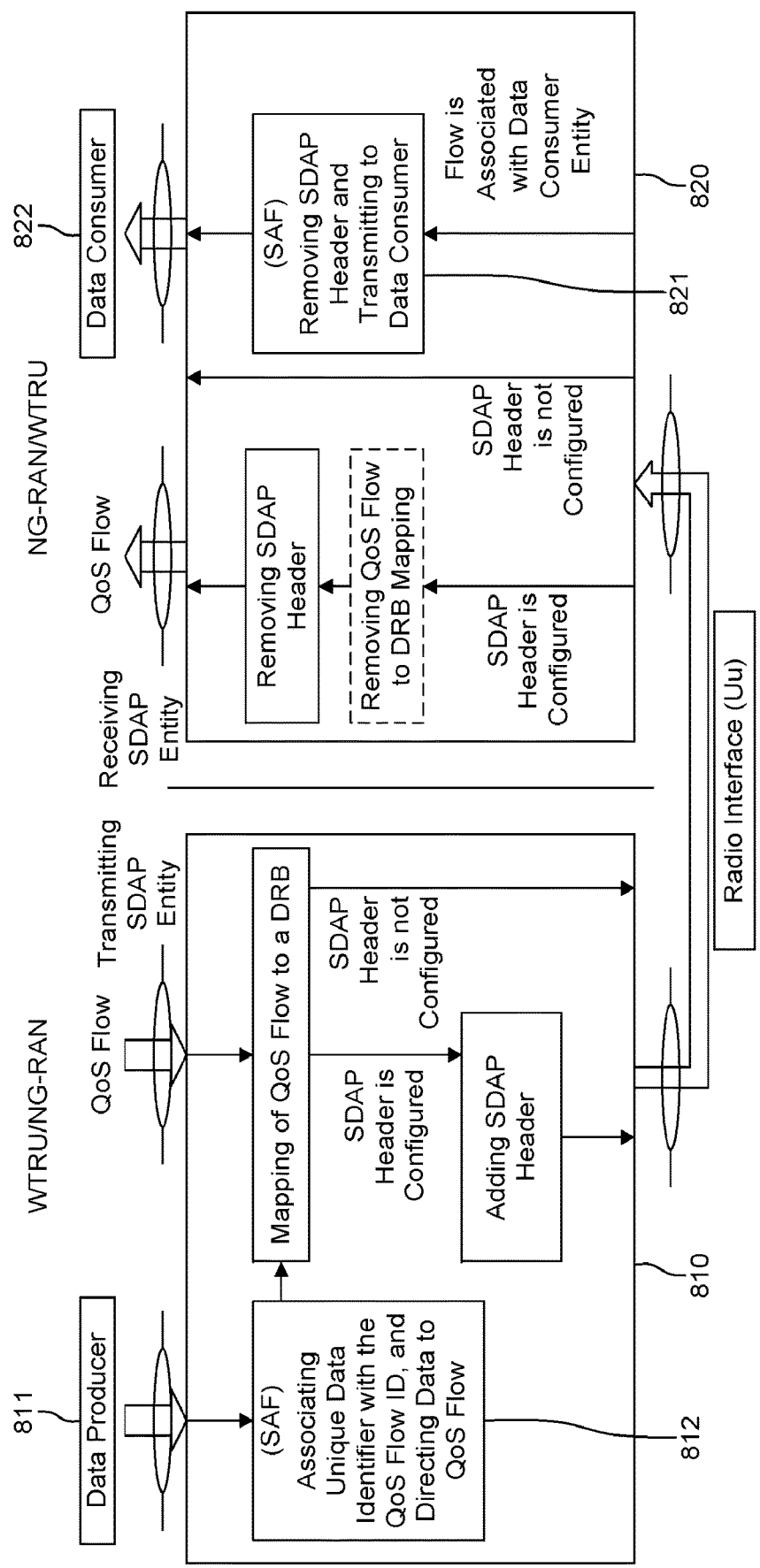
FIG. 8 illustrates an example implementation of the SAF in an NR system.

FIG. 8 illustrates an example implementation of the SAF in an NR system. The NR system may include a WTRU that engages in communication with a network node of a Radio Access Network (e.g., a Next-Generation (NG) RAN) over a radio interface (e.g., an air interface (Uu)). A transmitting entity 810 defined at the SDAP layer may receive data from a data producer 811 and SDUs associated with a QoS requirement (e.g., a QoS flow). The QoS flow may have an associated QoS flow ID (QFI), or a QFI may be assigned or allocated at the SDAP layer. The data from the data producer as well as the data flows may be passed to an SAF 812 at the transmitting SDAP entity 810 in SDAP SDUs. The SAF may associate, assign, or allocate, a UDI with the data from the data producer such that the data is associated with the QoS flow (e.g., by way of a UDI to QoS Flow ID association). The transmitting SDAP entity 810 may include functionality that allows for mapping of the QoS flow to a dedicated radio bearer (DRB). The SDAP entity 810 may have additional functionality allowing an SDAP header to be configured for SDUs received at the SDAP layer. The header may include one or more of information associated with the QoS flow to DRB mapping or the association between the UDI and the QoS flow. If a header is configured, the transmitting SDAP entity 810 may add the SDAP header to the SDU, to produce PDUs for transmission toward a receiving SDAP entity 820 using the radio interface. If headers are not configured, the transmitting entity 810 may transmit the SDUs towards the receiving SDAP entity 820 without adding a header or headers. The SDU or PDU may be received at the receiving SDAP entity 820. The receiving SDAP entity 820 may determine whether an SDAP header is or was configured. If so, the receiving SDAP entity 820 may determine a reflective QoS flow to DRB mapping based on, for example, a QoS Flow Identifier included in the header or headers. The receiving SDAP entity may remove the header or headers before forwarding the payload of the PDU to other network elements. If an SDAP header was not configured for the SDU, the receiving SDAP entity may simply pass forward the SDU via data flows to the other network elements. The receiving SDAP entity may additionally, or alternatively, be configured with an SAF 821. The SAF 821 may be configured to receive the SDUs or PDUs sent by the transmitting SDAP entity 810. The SAF may be capable of associating the SDUs or PDUs with a QoS Flow (e.g., based on a QFI) and further associating the QoS Flow with one or both of the data producer entity 811 or a data consumer entity 822 (e.g., based on a UDI). QFI or UDI information used to derive the relationships may be included in an SDAP header, when configured, or signaled between the SAF 812 and 821 via control signaling. If a header is included in a received PDU, the SAF 821 may remove the header or headers and transmit data PDU to the data consumer entity.

Figure 9:
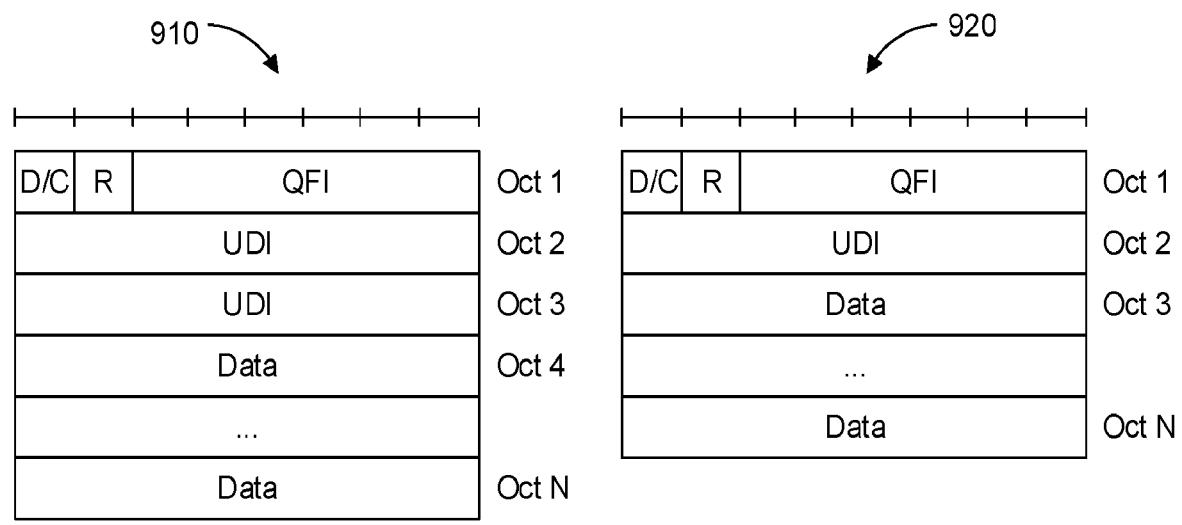
FIG. 9 depicts two examples of UDI as may be carried in an SDAP header.

FIG. 9 depicts two examples of UDI as may be carried in an SDAP header (shown for example, by the headers 910 and 920). UDI may be an identifier that is used to indicate a device, application, or a peripheral data source. The UDI may be integer or tuple, or it may be an integer that refers to a configured tuple. In some solutions, the UDI may be transmitted via SDAP control or data packets and the UDI associations (e.g. QFI/PFI) may be transmitted via RRC signaling. The UDI may be used to maintain source sensor information from data producer entity to consumer entity. More specifically, the UDI may be different from the QoS Flow ID (QFI) used in 5G core network and may also be different from a ProSe Network Flow Identifier (PFI). The UDI may be mapped by the SAF function to a QFI or a PFI of an NR system. As shown in FIG. 9, an SDAP header may include UDIs using one (e.g., as shown in header 920) or multiple octets (e.g., as shown in header 920). The SDAP header may further include a 1-bit data/control (D/C) indicator, which signals whether the SDAP PDU is an SDAP Data PDU or an SDAP Control PDU. The header may further include a QFI field indicating an ID of the QoS Flow to which the SDAP PDU belongs.

FIG. 10 portrays an example flow of data and mapping of Unique Data Identifier (UDI) to Flow IDs of an NR system. Data producer and consumer entities may be used to interface with the actual device sensors. Such entities may connect the sensors to an SAF function in addition to connecting data sources to the data consuming application. A Sensor Adaptation Function (SAF) may map Unique Data Identifiers corresponding to data flows originating from sensors or manufacturing devices to 3GPP systems. As shown at 1012 and 1014, the SAF may be implemented within both the transmitting and receiving entities. Each SAF may also have a control entity 1013 and 1015 on both the transmitting and receiving sides respectively that configure, control and negotiate SAF and RAN parameters (e.g. UDI to QFI mapping and Flow add/modification/release). The data producer entity 1011 may be connected to device peripherals and interface with the device bus. The producer entity 1011 may have a mechanism to produce SAF SDUs. The data consumer entity 1016 may receive the SAF SDUs that data producer entity 1011 produces and transmits. The system may be symmetrical such that both the WTRU and network have corresponding entities.

Further aspects of the SAF Control Function are described herein. One purpose of the SAF control function may be to control the SAF function and to coordinate the SAF UDI to QFI mapping with RAN and 5G-Core Network entities. The SAF control function may request QFI addition, modification, or removal from the core network, which may then initiate a corresponding QoS Flow addition, modification, or removal procedure. The SAF control function may also configure and coordinate the data producer and consumer entities. For instance, when it is necessary to allocate one or more Unique Data Identifiers for specific sensor functions, the control function can allocate free UDIs for those specific sensors. The SAF control function may be centralized or it may have two corresponding components on transmitting and receiving side. The SAF components may share UDI configuration between these two SAF entities.

The control function may also know the sensor type identifier which may have mapping to a standardized sensor category. The SAF may then request, based on the category, QFI addition and/or modification. Sensor Adaptation Controller Functionality may include: creating a UDI to QFI association; updating a UDI to QFI association; terminating a UDI to QFI association; requesting a new QFI and/or QFI modification from the Core Network (e.g., via a Policy Control Function (PCF)); allocating one or more UDIs for a producer; mapping UDI to a sensor type identifier; or transmitting the UDI to QFI mapping information.

It may be necessary to transmit QFI to UDI mapping information from a transmitting entity to a receiving entity. There may be several methods for transmitting the association. In some embodiments, the transmission can be performed, for example, via explicit RRC signaling (e.g., by sending an RRC configuration to the SAF controller). In some embodiments, the transmitting entity may use an SAF function that modifies the header. For example, an in-band signaling mechanism, such as a header, may be used (e.g., in the case where UDI is placed either to a data or control element of SDAP layer). Upon receiving the header, the SAF at the receiver end may associate a QFI and UDI without explicit control signaling. The UDI may be associated one or multiple times with the same QFI.

Methods for activating and deactivating data flows are described herein. The data flows associated with the UDI may need to be activated or deactivated when data transmission is starting or finished. Upon receiving data from a data producer entity, an SAF may a data flow procedure and start transmitting packets with UDI association to the SDAP entity. A data producer entity and/or the SAF may terminate or deactivate the data flows, for example, when the UDI-associated flow is terminated, when explicit RRC signaling to terminate the mapping has been received, or when transmitting entity's UDI is terminated.

Further aspects of the data producer entity are described herein. The data producer entity may be defined as a logical entity that produces data from the WTRU (either data corresponding to the wireless interface of the WTRU, or other peripherals/interfaces e.g. sensors). One purpose of the data producer entity may be to provide an interface entity to the 3GPP system from which data can be read in a specified format. The data sources may be used to provide specified 3GPP measurements or the source may be associated with a peripheral of a terminal device. For example, each data producer entity may have a peer data consumer entity that consumes the produced data and feeds the produced data to other portions of a 3GPP system or to external data processing entity. The data producer entity may be a corresponding data consumer entity on the receiving side of the transmission link. The data producer entity may generate PDUs that may be recognized as SDAP SDUs from the 3GPP system perspective. The entity may be identified by a Unified Data Identifier (UDI) that is associated with the QFI. The UDI may be added to the header of PDUs produced by the data producer entity.

It may be desirable that the data producer entity be able to acquire data from various sources. An application, such as that described substantially above with respect to FIG. 2, may perform various system procedures and optimization if certain generic data is available. For instance, if battery and dynamic power consumption data are available for an application, it may perform power optimization for the system. Such mechanisms that enable acquisition of these types of generic data represent just one aspect of the presently disclosed embodiments.

Data sourced by the data producer entity may include traditional 3GPP-specified measurements, but are not limited to those specified by the 3GPP. Data sources may include, for example, wireless data interfaces, a radio frequency (RF) front end (including, e.g., circuitry responsible for processing a received signal at the original incoming frequency), an RF transceiver, a baseband module or processor, a WIFI and/or Bluetooth module, an NFC controller, and/or an RF Board. Data sources may include battery-associated sensors, which may provide temperature, voltage, output voltage, charge, discharge, and/or wireless charging module information. Data sources may also include positional sensors, such as accelerometers, barometers, gyroscopes, or ambient light sensors, as well as sensors or modules configured to provide positioning information via GPS, GLONASS, Galileo, Digital Compass, iBeacon or other technologies. Data sources may provide system information, such as CPU, GPU, and/or Neural Engine power consumption information, memory utilization, cache misses, and statistics from each individual hardware component. System peripherals, such as complementary metal-oxide-semiconductor (CMOS) image sensors, Light Detection and Ranging (LIDAR), Radio Detection and Ranging (RADAR), or Sound Navigation and Ranging (SONAR) systems may also be used as data sources.

A data producer entity may provide information to the SAF such that a packet may be transmitted to a 3GPP system. The information may comprise information associated with the size of the data (e.g., the size of a PDU or SDU), and the identifier information associated with the particular data stream (e.g., UDI) and/or header size or type information. For example, the data producer entity may indicate the size of a data PDU or SDU to calculate the required packet size. Such payload information may be provided along with, or separate from, the header information, which may be separately configured or preconfigured. In some solutions, the header size may be fixed and known by the SAF or other entities on the receive size. Alternatively, or additionally, the data producer entity may use a type indicator, for example, a field of length 1-3 bits, that indicates the format of the header. The header information may be configured by a controller.

Where multiple data streams are used, the producer entity may be associated with one or more of the data streams via an identifier (e.g., UDI) by way of the SAF. This may allow the data stream to be uniquely identified by the data consumer entity. The identifier may be transmitted via in-band signaling or out-of-band signaling. The identifier and/or associated information may be exchanged between the data producer and data consumer entities, for example, via a central configuration controller, or by including the information in the header. In some solutions, the header content may be configured by a controller. The identifier and/or associated information may include a Unique Data Identifier (the UDI), which identifies the data stream, or a Data Model Identifier (DMI), which identifies the data model of the payload, and may be a single identifier or a tuple. The identifier and/or associated information may further include a payload size. In some solutions, the data consumer entity may also receive payload size information directly from the receiving SDAP layer. The identifier and/or associated information may further include one or more security keys.

Further aspects of the data consumer entity are described herein. The data consumer entity may be a peer entity of the data producer entity. The data consumer entity may receive SDAP SDUs and consume the received data directly or pass the received data to another entity. The data consumer entity may use UDI information associated with the data flow and/or the SDAP SDU to associate the data flow identifier with a corresponding data model. The data consumer may be implemented as CPU, GPU, FPGA, or DNN Accelerator. The data consumer entity may process the data itself or feed it forward. For example, the data consumer entity may perform transformations, filtering, inference, or storage operations using the data.

Solutions implementing a Sensor Adaptation Function within a sidelink framework are described herein. A vehicle-to-everything (V2X) model may require a V2X application server to be exposed via one or more network exposure function. In some cases, an SAF mechanism may be used together with a sidelink application to perform low latency processing. For example, when a low latency application is deployed close to Road Service Units (RSUs), the application server may use an SAF to gain access to WTRU measurements, peripherals or other sensor data. The V2X layer may use UDI to map data flows between data consumer and producer peripherals. The V2X application or application server may be implemented or located in a gNB or close to a gNB. The mechanism may operate substantially as described above with respect to FIGS. 4 through 10 and related embodiments.

Figure 11:
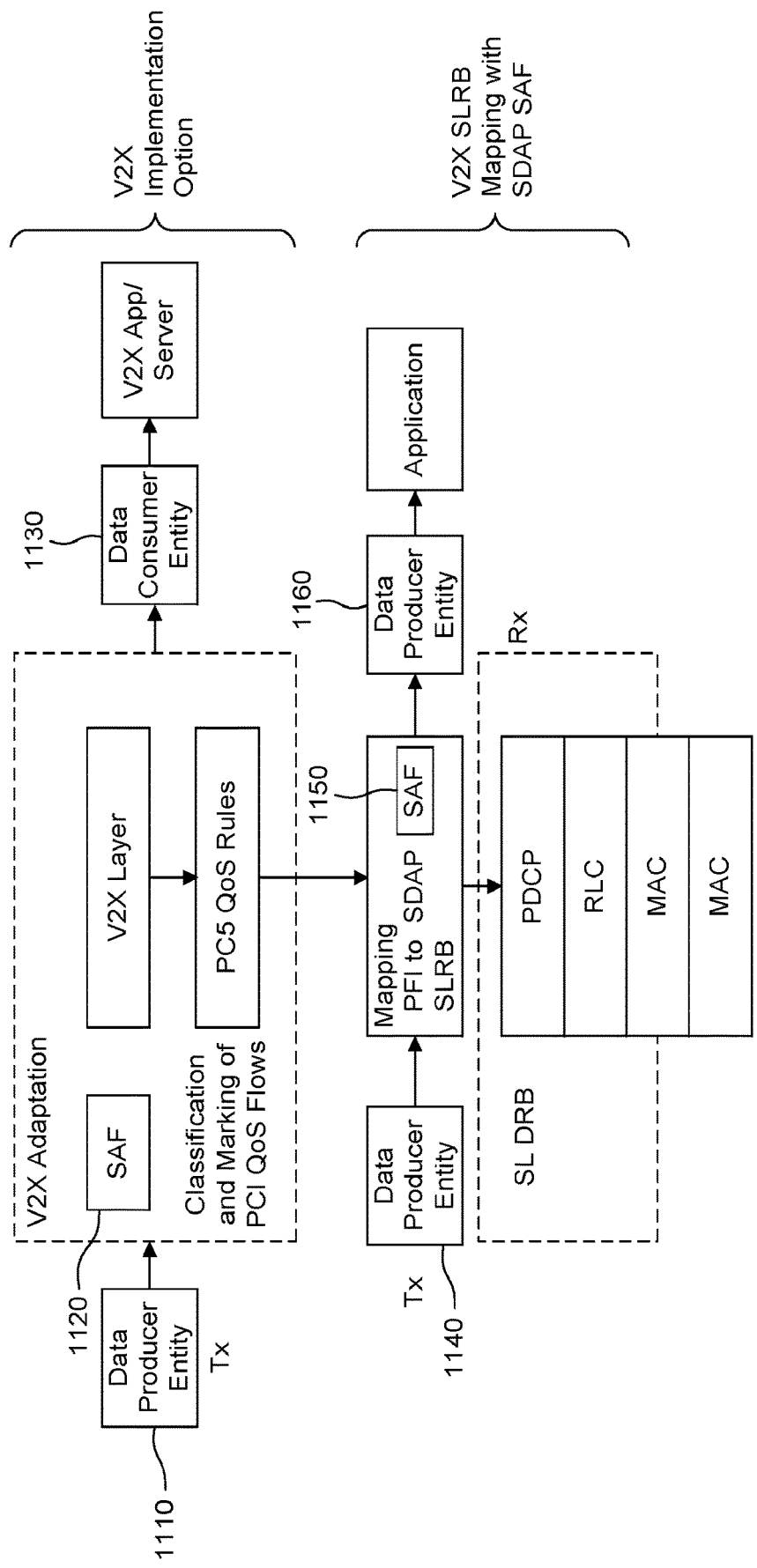
FIG. 11 portrays an SAF as implemented in a vehicle-to-everything (V2X) model.

FIG. 11 portrays an SAF as implemented in a V2X model. As shown, a data producer entity 1110 (e.g., a transmitting WTRU) may send data flows towards a V2X application or application server. The data flows may pass through a V2X adaptation layer, which may be responsible for classifying and marking PCI QoS Flows. An SAF 1120 may be implemented in the V2X adaptation layer, and may be used to map UDI corresponding to the data flows between data consumers and data producers. Prior to being transmitted to the V2X application or application server, the data flows may be received by a data consumer entity 1130 (e.g., a receiving WTRU). FIG. 11 further shows an SAF as may be used in mapping V2X sidelink radio bearers (SLRBs). A data producer entity 1140 (e.g., a transmitting WTRU) may transmit data flows to the SDAP layer, in which an SAF 1150 may be implemented. As described substantially with regards to FIGS. 4 through 10 and related embodiments, the SAF may be used to map UDI to data flows. The data flows may be received by a data consumer entity 1160 (e.g., a receiving WTRU) prior to transmission toward a sidelink application.

Figure 12:
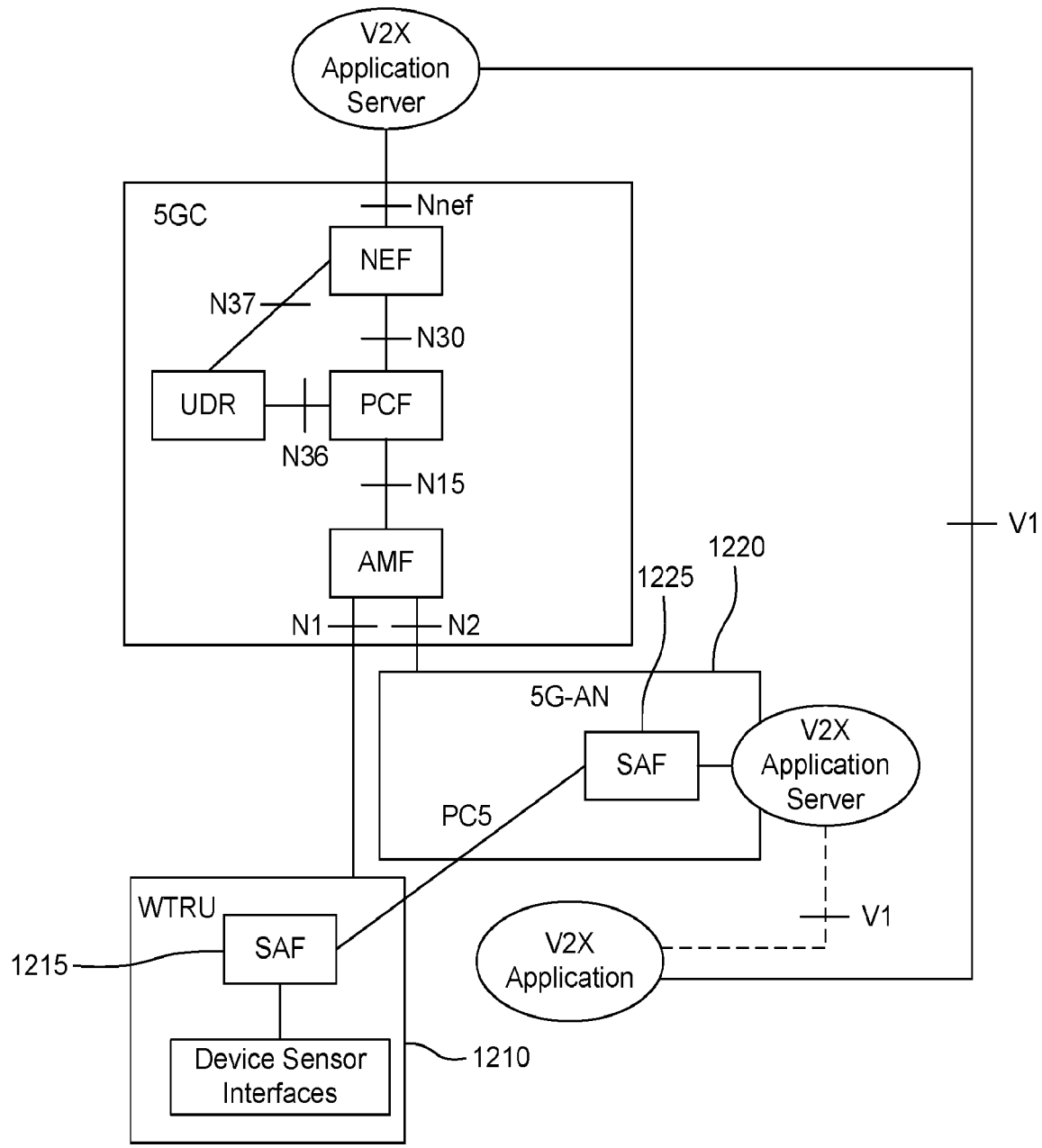
FIG. 12 illustrates an SAF within a representation of V2X reference points.

FIG. 12 illustrates an SAF within a representation of V2X reference points. A WTRU 1210 may communicate with a 5G Access Network (AN) 1220 over a PC5 reference point. The WTRU 1210 may be configured with a transmitting SAF 1215 and the 5G-AN may be configured with a receiving SAF 1225. As shown, the SAFs 1215 and 1225 may enable communication over the PC5 reference point so that the V2X server is located in a virtualized gNB.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a processor; and
a transceiver;
the transceiver configured to receive configuration information associating a plurality of unique data identifiers (UDIs) with a respective plurality of quality of service (QoS) flows;
the transceiver configured to receive first sensor data and information indicating one of the plurality of UDIs;
the processor and the transceiver configured to transmit, using one of the respective plurality of QoS flows, a first protocol data unit (PDU) including the first sensor data, wherein the one of the respective plurality of QoS flows is selected based on the received information indicating the one of the plurality of UDIs;
the transceiver configured to receive updated configuration information associating the one of the plurality of UDIs with another one of the respective plurality of QoS flows;
the transceiver configured to receive second sensor data and information indicating the one of the plurality of UDIs; and
the processor and the transceiver configured to transmit, using the another one of the respective plurality of QoS flows, a second protocol data unit (PDU) including the second sensor data, wherein the another one of the respective plurality of QoS flows is selected based on the received information indicating the one of the plurality of UDIs.

2. The WTRU of claim 1, wherein the first sensor data and the second sensor data are received from a data source, and wherein sensor data received from other data sources is differentiated from the first sensor data and the second sensor data based on different UDIs that are transmitted with the sensor data received from the other data sources.

3. The WTRU of claim 1, the transceiver configured to transmit a message to a network node requesting termination of an association between a UDI and a QoS flow.

4. The WTRU of claim 1, the transceiver configured to transmit configuration information to another WTRU including information associating the one of the plurality of UDIs with the one of the respective plurality of QoS flows.

5. The WTRU of claim 1, wherein the first PDU and the second PDU each include a header including information indicating the one of the plurality of UDIs.

6. The WTRU of claim 1, wherein at least one of the configuration information or the updated configuration information are received from a network node.

7. The WTRU of claim 1, wherein the updated configuration information is received in response to the transmission of the first PDU.

8. The WTRU of claim 1, wherein the updated configuration information releases the association between the one of the plurality of UDIs and the one of the respective plurality of QoS flows.

9. The WTRU of claim 2, wherein the data sources provide sensor data of one or more types, the one or more types including: wireless data; battery-associated data; positional data; positioning data; system information; or system peripheral data.

10. The WTRU of claim 9, wherein the processor is configured to determine an association between a UDI and a QoS flow based on the type of sensor data received from each data source.

11. A method performed by a wireless transmit/receive unit (WTRU), the method comprising:
receiving configuration information associating a plurality of unique data identifiers (UDIs) with a respective plurality of quality of service (QoS) flows;
receiving first sensor data and information indicating one of the plurality of UDIs;
transmitting, using the one of the respective plurality of QoS flows, a first protocol data unit (PDU) including the first sensor data, wherein the one of the respective plurality of QoS flows is selected based on the received information indicating the one of the plurality of UDIs;
receiving updated configuration information associating the one of the plurality of UDIs with another one of the respective plurality of QoS flows;
receiving second sensor data and information indicating the one of the plurality of UDIs; and
transmitting, using the another one of the respective plurality of QoS flows, a second protocol data unit (PDU) including the second sensor data, wherein the another one the respective plurality of QoS flows is selected based on the received information indicating the one of the plurality of UDIs.

12. The method of claim 11, wherein the first sensor data and the second sensor data are received from a data source, and wherein data received from other data sources is differentiated from the first sensor data and the second sensor data based on different UDIs that are transmitted with the data received from the other data sources.

13. The method of claim 11, further comprising: transmitting a message to a network node requesting termination of an association between a UDI of the plurality of UDIs and one of the respective plurality of QoS flows.

14. The method of claim 11, further comprising: transmitting configuration information to another WTRU including information associating the one of the plurality of UDIs with the one of the respective plurality of QoS flows.

15. The method of claim 11, wherein the first PDU and the second PDU each include a header including information indicating the one of the plurality of UDIs.

16. The method of claim 11, wherein at least one of the configuration information or the updated configuration information are received from a network node.

17. The method of claim 11, wherein the updated configuration information is received in response to the transmission of the first PDU.

18. The method of claim 11, wherein the updated configuration information releases the association between the one of the plurality of UDIs and the one of the respective plurality of QoS flows.

19. The method of claim 12, wherein the data sources provide sensor data of one or more types, the one or more types including: wireless data; battery-associated data; positional data; positioning data; system information; or system peripheral data.

20. The method of claim 19, further comprising determining an association between a UDI and a QoS flow based on the type of sensor data received from each data source.

* * * * *